(12) United States Patent
Nozue et al.

(10) Patent No.: US 9,963,047 B2
(45) Date of Patent: May 8, 2018

(54) SEAT SLIDING DEVICE FOR VEHICLE

(71) Applicant: SHIROKI CORPORATION, Fujisawa-shi (JP)

(72) Inventors: Norihisa Nozue, Fujisawa (JP); Takayuki Sakurai, Fujisawa (JP); Nobumasa Higashi, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days. days.

(21) Appl. No.: 15/159,690

(22) Filed: May 19, 2016

(65) Prior Publication Data
US 2016/0355106 A1 Dec. 8, 2016

(30) Foreign Application Priority Data
Jun. 3, 2015 (JP) .................. 2015-113188

(51) Int. Cl.
*B60N 2/07* (2006.01)
*B60N 2/42* (2006.01)
*B60N 2/015* (2006.01)
*B60N 2/08* (2006.01)
*B60R 22/26* (2006.01)

(52) U.S. Cl.
CPC ....... *B60N 2/0705* (2013.01); *B60N 2/01541* (2013.01); *B60N 2/073* (2013.01); *B60N 2/0825* (2013.01); *B60N 2/0875* (2013.01); *B60N 2/43* (2013.01); *B60N 2/0715* (2013.01); *B60N 2/42* (2013.01); *B60R 22/26* (2013.01)

(58) Field of Classification Search
CPC .... B60N 2/01583; B60N 2/12; B60N 2/0155; B60N 2/0702; B60N 2/0722; B60N 2/0735; B60N 2/073; B60N 2/42; B60N 2/43; B60N 2/01541; B60R 22/26
USPC ........... 248/429, 430, 423, 503.1; 296/65.03, 296/65.13, 65.15, 64, 65.01, 65.11; 297/348.13, 344.1
See application file for complete search history.

(56) References Cited

U.S. PATENT DOCUMENTS

| 3,897,101 | A | * | 7/1975 | Hess | ....................... B60N 2/067 248/429 |
| 4,262,963 | A | * | 4/1981 | Bauer | .................... B60N 2/072 248/429 |
| 4,669,782 | A | * | 6/1987 | Nishiyama | ........... B60N 2/0715 297/468 |
| 4,720,072 | A | * | 1/1988 | Kitano | ................... B60N 2/072 248/429 |
| 4,760,988 | A | * | 8/1988 | Bianchi | ................ B60N 2/0707 248/420 |

(Continued)

FOREIGN PATENT DOCUMENTS

JP 2011-235788 A 11/2011

*Primary Examiner* — Stanton L Krycinski
*Assistant Examiner* — Taylor L Morris
(74) *Attorney, Agent, or Firm* — McGinn I.P. Law Group, PLLC

(57) ABSTRACT

A seat sliding device for a vehicle includes a lower rail; an upper rail, which is supported to be able to slide relative to the lower rail and is fixed to a seat; and a bracket, which includes an acting portion to transmit a predetermined external force acting on the upper rail to the lower rail and is fixed to the upper rail, wherein the acting portion is disposed to overlap with the lower rail in an up-down direction which is perpendicular to a longitudinal direction of the sliding device.

9 Claims, 3 Drawing Sheets

(56) References Cited

U.S. PATENT DOCUMENTS

| | | | | |
|---|---|---|---|---|
| 4,770,459 A * | 9/1988 | Nakaiwa | B60R 22/26 | 248/503.1 |
| 4,818,022 A * | 4/1989 | Nishimura | B60N 2/06 | 280/804 |
| 5,152,552 A * | 10/1992 | Ikegaya | B60R 22/26 | 280/806 |
| 5,322,348 A * | 6/1994 | Johnson | B60N 2/0705 | 248/430 |
| 5,562,322 A * | 10/1996 | Christoffel | B60N 2/01583 | 248/503.1 |
| 5,653,506 A * | 8/1997 | Wisner | B60N 2/0705 | 248/429 |
| 5,755,422 A * | 5/1998 | Susko | B60N 2/0705 | 248/430 |
| 5,785,387 A * | 7/1998 | Hernandez | B60N 2/0705 | 248/429 |
| 5,826,936 A * | 10/1998 | Scordato | B60N 2/0705 | 297/216.1 |
| 5,951,086 A * | 9/1999 | Hoshino | B60N 2/01583 | 296/65.03 |
| 5,957,535 A * | 9/1999 | Pasternak | B60N 2/0705 | 248/429 |
| 6,019,412 A * | 2/2000 | Liu | B60N 2/0705 | 296/65.13 |
| 6,123,379 A * | 9/2000 | Yamada | B60N 2/01583 | 296/65.03 |
| 6,152,515 A * | 11/2000 | Wieclawski | B60N 2/01583 | 296/65.03 |
| 6,161,890 A * | 12/2000 | Pesta | B60N 2/01591 | 248/503.1 |
| 6,234,574 B1 * | 5/2001 | Hoshihara | B60N 2/01583 | 297/331 |
| 6,279,981 B1 * | 8/2001 | Mesnage | B60N 2/002 | 296/65.03 |
| 6,352,312 B1 * | 3/2002 | Rees | B60N 2/071 | 248/429 |
| 6,431,631 B1 * | 8/2002 | Hofmann | B60N 2/01508 | 296/65.03 |
| 6,488,250 B1 * | 12/2002 | Munch | B60N 2/0715 | 248/430 |
| 6,945,585 B1 * | 9/2005 | Liu | B60N 2/01583 | 292/216 |
| 7,108,305 B2 * | 9/2006 | Frazier | B60N 2/01583 | 296/65.03 |
| 7,270,362 B2 * | 9/2007 | Rausch | B60N 2/01541 | 296/65.03 |
| 7,309,107 B2 * | 12/2007 | Smith | B60N 2/0705 | 248/429 |
| 7,431,371 B2 * | 10/2008 | Miller | B60N 2/01583 | 296/65.03 |
| 7,604,214 B2 * | 10/2009 | Kojima | B60N 2/0705 | 248/430 |
| 7,775,578 B2 * | 8/2010 | McDermott | B60N 2/01583 | 296/65.03 |
| 8,398,141 B2 * | 3/2013 | Parker | B60N 2/0705 | 296/64 |
| 8,851,548 B2 * | 10/2014 | Pacolt | B60N 2/01583 | 296/65.03 |
| 2002/0033625 A1 * | 3/2002 | Goy | B60N 2/0705 | 297/344.18 |
| 2005/0212338 A1 * | 9/2005 | Muller | B60N 2/01583 | 297/336 |
| 2011/0024595 A1 * | 2/2011 | Oi | B60N 2/0705 | 248/429 |
| 2011/0278420 A1 | 11/2011 | Kitamura et al. | | |
| 2013/0285430 A1 * | 10/2013 | Ohba | B60N 2/2352 | 297/367 P |
| 2015/0130242 A1 * | 5/2015 | Markel | B60N 2/01583 | 297/344.1 |

* cited by examiner

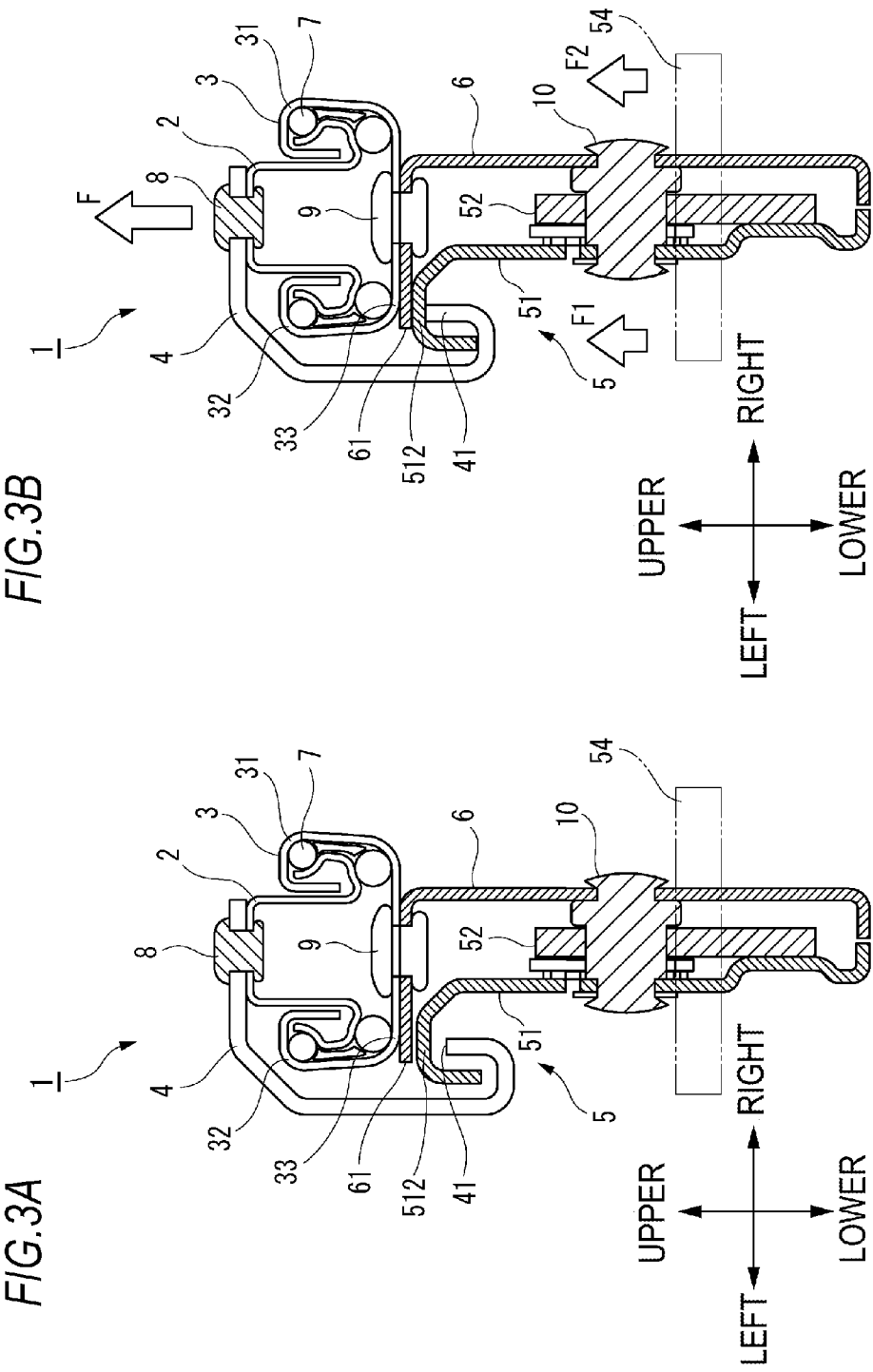

SEAT SLIDING DEVICE FOR VEHICLE

CROSS-REFERENCE TO RELATED APPLICATION

This application claims priority from Japanese Patent Application No. 2015-113188 filed on Jun. 3, 2015, the entire subject matter of which is incorporated herein by reference.

TECHNICAL FIELD

This disclosure relates to a seat sliding device for a vehicle.

BACKGROUND ART

There is a seat sliding device for a vehicle including a lower rail and an upper rail (for example, see JP-A-2011-235788). In the sliding device disclosed in JP-A-2011-235788, the upper rail is configured to slide relative to the lower rail fixed on a floor of a vehicle body. A J hook member having a J-shaped cross section is attached to the upper rail with a hook attachment bracket interposed therebetween. A reinforcing member including a flange portion coming in contact with the J hook member is attached to the lower rail. According to this configuration, when an upward force is applied to the upper rail, the J hook member comes in contact with the flange portion of the reinforcing member, and thus a part of the force is absorbed by the reinforcing member.

SUMMARY

However, in the sliding device disclosed in JP-A-2011-235788, the size of the sliding device in a width direction (right-left direction) perpendicular to a longitudinal direction thereof increases due to the J hook member. Accordingly, the overall size in the width direction of the vehicle seat increases.

This disclosure is to provide a seat sliding device for a vehicle that is able to enhance reliability against an external force and is able to easily decrease a size in a width direction.

A seat sliding device for a vehicle according to one aspect of this disclosure includes: a lower rail; an upper rail, which is supported to be able to slide relative to the lower rail and is fixed to a seat; and a bracket, which includes an acting portion to transmit a predetermined external force acting on the upper rail to the lower rail and is fixed to the upper rail, wherein the acting portion is disposed to overlap with the lower rail in an up-down direction which is perpendicular to a longitudinal direction of the sliding device.

According to this configuration, since the bracket is fixed to the upper rail, a part of the external force acting on the upper rail is transmitted to the lower rail via the bracket and the other external force is transmitted to the lower rail without passing through the bracket. Therefore, since an external force is transmitted to the lower rail via two paths of a path passing through the bracket and a path not passing through the bracket, it is possible to prevent an external force from being concentrically transmitted to only a part of the lower rail. The acting portion of the bracket is disposed to overlap with the lower rail in the up-down direction. Accordingly, it is possible to provide a seat sliding device for a vehicle that is able to enhance reliability against an external force and is able to easily decrease a size in a width direction.

According to another aspect of this disclosure, the above-mentioned seat sliding device further includes: a lock device, which is disposed to overlap with the lower rail in the up-down direction, wherein the lock device includes: a base; a hook, which is rotatably fixed to the base and includes an insertion portion; a pawl, which is rotatably fixed to the base and engages with the hook; and a striker, which is configured to be inserted into the insertion portion, wherein the striker is suppressed from being detached from the insertion portion by the hook and the base in a state where the hook and the pawl are engaged with each other, and wherein the base comes in contact with the acting portion in a state where a predetermined external force are acted on the upper rail.

According to this configuration, since the base comes in contact with the acting portion in a state where a predetermined external force acts on the upper rail, an external force acting on the upper rail is transmitted to the base via the acting portion as well as the lower rail. The external force transmitted to the base is transmitted to the hook and the striker. In this way, since the external force acting on the upper rail is distributed and transmitted to the lower rail and the striker, it is possible to provide a seat sliding device for a vehicle with higher reliability against an external force.

According to another aspect of this disclosure, the above-mentioned seat sliding device further includes: a riser, which is fixed to the base and the lower rail, wherein the hook is disposed between the base and the riser in a width direction, which is perpendicular to both the longitudinal direction and the up-down direction of the sliding device.

According to this configuration, in a state where a predetermined external force acts on the upper rail, a part of the external force is transmitted to the hook via the bracket and the base, and the remaining external force is transmitted to the hook via the lower rail and the riser. The hook is disposed between the base and the riser in the width direction. Accordingly, since the external force is transmitted to the hook via two paths of a path passing through the base disposed on one side of the hook and a path passing through the riser disposed on the other side of the hook, the hook is not inclined in the width direction even when an external force acts on the upper rail. As a result, the hook comes in line contact with the striker. In this way, since a large stress is suppressed from being locally applied to the striker due to point contact with the striker in a state where the hook is inclined with a predetermined external force, it is possible to provide a seat sliding device for a vehicle with higher reliability against an external force.

According to this disclosure, it is possible to provide a seat sliding device for a vehicle that can enhance reliability against an external force and can easily decrease a size in a width direction.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 3A and 3B are cross-sectional views taken along line IIIA, IIIB-IIIA, IIIB of the sliding device illustrated in FIG. 2, where FIG. 3A illustrates a state of the sliding device when an external force does not act on an upper rail and FIG. 3B illustrates a state of the sliding device when an external force acts on the upper rail.

SUMMARY

Figure 1:
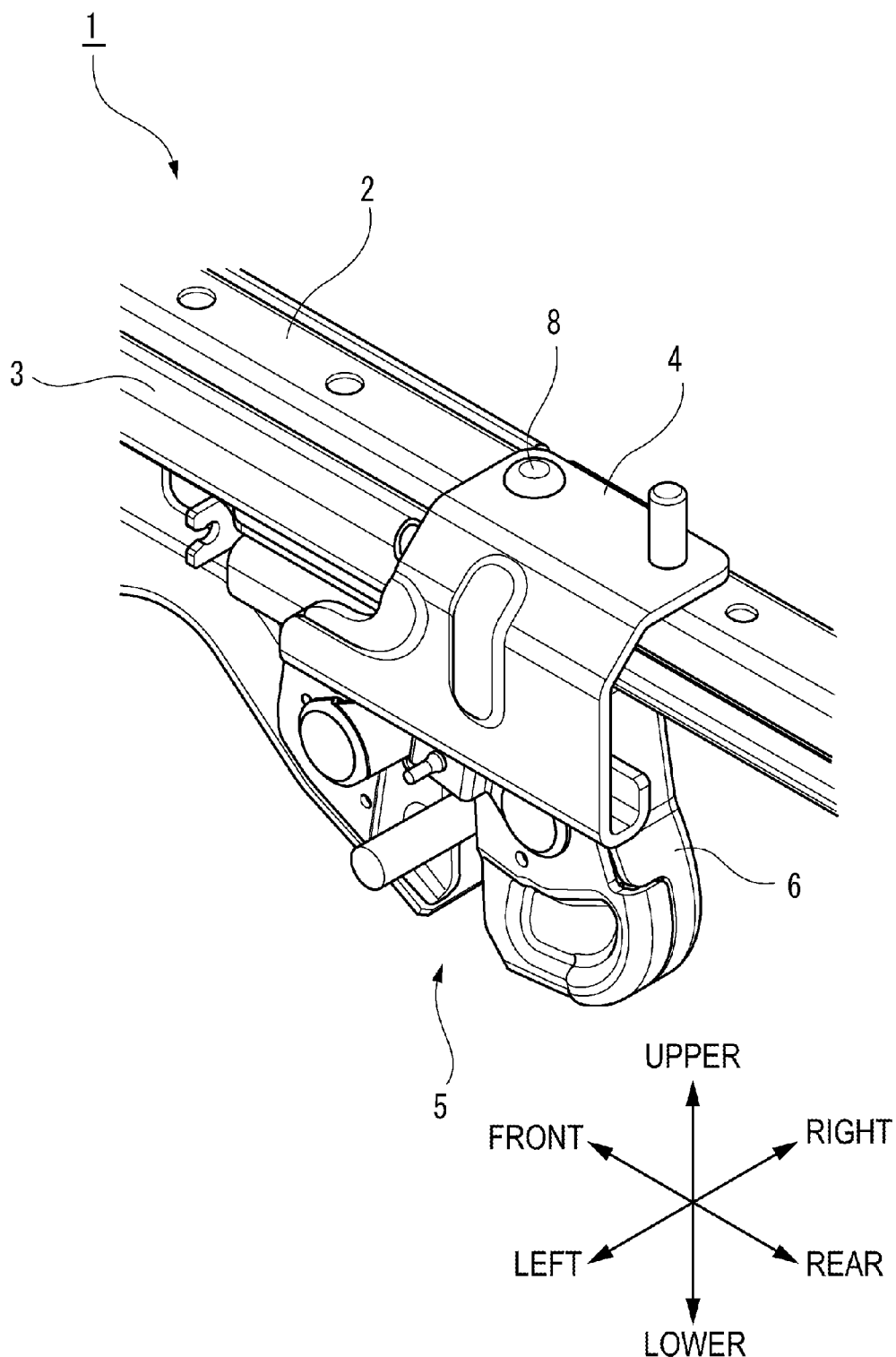
FIG. 1 is an overall perspective view illustrating a seat sliding device for a vehicle according to an embodiment of this disclosure.

Hereinafter, an embodiment of this disclosure will be described with reference to the accompanying drawings. In the description, members having the same reference numerals as members described already will be omitted for the purpose of convenience of explanation. Sizes of members illustrated in the drawings may be different from actual sizes of the members for the purpose of convenience of explanation.

In describing this embodiment, for the purpose of convenience of explanation, the "right-left direction," the "front-rear direction," and the "up-down direction" will be properly described. These directions are relative directions which are set for a seat sliding device 1 for a vehicle (hereinafter, simply referred to as a sliding device 1) illustrated in FIG. 1. Accordingly, when the sliding device 1 illustrated in FIG. 1 rotates in a predetermined direction, it should be noted that these directions also rotate. Therefore, the "up-down direction" is a direction including an "upward direction" and a "downward direction." The "front-rear direction" is a direction including a "forward direction" and a "rearward direction." The "right-left direction" is a direction including a "leftward direction" and a "rightward direction."

Figure 2:
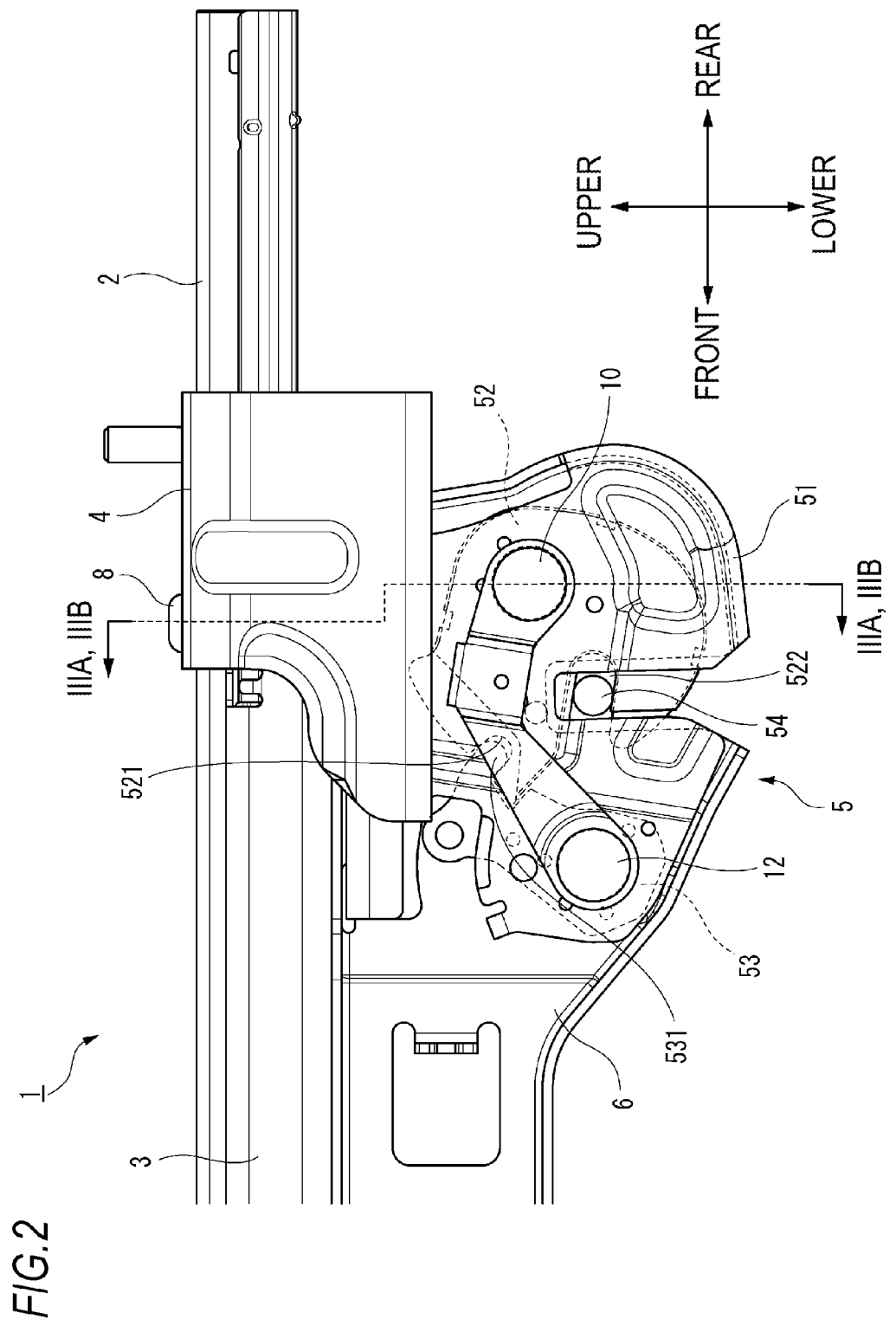
FIG. 2 is a left side view of the sliding device illustrated in FIG. 1.

A configuration of the sliding device 1 according to an embodiment of this disclosure will be described below with reference to FIGS. 1 to 3B. FIG. 1 is an overall perspective view illustrating the sliding device 1 according to an embodiment of this disclosure. FIG. 2 is a left side view of the sliding device 1 illustrated in FIG. 1. FIGS. 3A and 3B are cross-sectional views taken along line IIIA, IIIB-IIIA, IIIB of the sliding device 1 illustrated in FIG. 2.

The sliding device 1 is formed below a seat disposed in a vehicle and includes an upper rail 2, a lower rail 3, a bracket 4, a lock device 5, and a riser 6 as illustrated in FIG. 1. The upper rail 2 is fixed to a vehicle seat which is not illustrated and is supported to be slidable in the front-rear direction relative to the lower rail 3. Specifically, as illustrated in FIGS. 3A and 3B, plural balls 7 disposed to roll are formed between the upper rail 2 and the lower rail 3, and the upper rail 2 is slidable relative to the lower rail 3 via the plural balls 7. The upper rail 2 is locked to the lower rail 3 by a lock mechanism which is not illustrated.

The bracket 4 is fixed to the upper rail 2 by a fixing member 8 such as a pin and is formed in a substantially J shape as viewed in the front-rear direction. As illustrated in FIGS. 3A and 3B, an end portion (acting portion) 41 of the bracket 4 is disposed to overlap with the lower rail 3 in the up-down direction (or as viewed in the up-down direction) perpendicular to the front-rear direction (longitudinal direction). Specifically, an end portion 41 of the bracket 4 is disposed just below the lower rail 3.

The lock device 5 is disposed to overlap with the lower rail 3 in the up-down direction (or as viewed in the up-down direction) of the sliding device 1 and is disposed specifically just below the lower rail 3 (see FIGS. 3A and 3B). The configuration of the lock device 5 will be described below with reference to FIG. 2.

As illustrated in FIG. 2, the lock device 5 includes a base 51, a hook 52, a pawl 53, and a striker 54. The hook 52 is rotatably fixed to the base 51 by a fixing member 10 such as a pin and includes an engagement recessed portion 521 and an insertion portion 522. The pawl 53 is rotatably fixed to the base 51 by a fixing member 12 such as a pin and includes an engagement protruding portion 531. The pawl 53 and the hook 52 are configured to engage with each other, and the engagement protruding portion 531 and the engagement recessed portion 521 are engaged with each other. The hook 52 and the pawl 53 are biased in a direction in which both are engaged with each other by a biasing member which is not illustrated.

The striker 54 is formed in a cylindrical shape and is fixed to a floor of a vehicle body. In a state where the pawl 53 and the hook 52 engage with each other, the striker 54 is inserted into the insertion portion 522. In this state, detachment of the striker 54 from the insertion portion 522 is suppressed by the hook 52 and the base 51 (that is, the striker 54 is locked by the hook 52). On the other hand, when the pawl 53 rotates in a counterclockwise direction in this state and the hook 52 and the pawl 53 are disengaged, the hook 52 rotates in the counterclockwise direction and the striker 54 is detached from the insertion portion 522 (that is, the striker 54 is unlocked). The detailed configuration of the lock device 5 is described in WO 2014/092134, for example.

The riser 6 will be described below. As illustrated in FIGS. 3A and 3B, the riser 6 is fixed to the lower rail 3 by a fixing member 9 such as a pin and is fixed to the base 51 and the hook 52 by the fixing member 10. An upper end 61 of the riser 6 is disposed between an acted portion 512 of the base 51 and a bottom 33 of the lower rail 3 in the up-down direction.

A state of the sliding device 1 when an upward external force F acts on the upper rail 2 will be described below with reference to FIGS. 3A and 3B. FIG. 3A illustrates the state of the sliding device 1 when an external force F does not act on the upper rail 2, and FIG. 3B illustrates the state of the sliding device 1 when an external force F acts on the upper rail 2.

As illustrated in FIG. 3A, in a state where an external force F does not act on the upper rail 2, a clearance is formed between the end portion 41 of the bracket 4 and the acted portion 512 of the base 51 and between the acted portion 512 and the upper end 61 of the riser 6. On the other hand, in the state where an external force F acts on the upper rail 2 as illustrated in FIG. 3B, the end portion 41 comes in contact with the acted portion 512 and also the acted portion 512 comes in contact with the upper end 61. At this time, the end portion 41 serves as an acting portion that transmits the external force F acting on the upper rail 2 to the bottom 33 of the lower rail 3 via the acted portion 512 and the upper end 61.

In this way, according to this embodiment, since the bracket 4 is fixed to the upper rail 2, a part of an external force F acting on the upper rail 2 is transmitted to tops 31, 32, of the lower rail 3 via the balls 7, and the remaining external force is transmitted to the bottom 33 of the lower rail 3 via the end portion 41 of the bracket 4. Specifically, since the external force F is transmitted to the lower rail 3 via the above-mentioned two paths, the external force F is suppressed from being concentrically transmitted to the tops 31, 32 of the lower rail 3. The end portion 41 of the bracket 4 is disposed to overlap with the lower rail 3 in the up-down direction. Accordingly, it is possible to provide the sliding device 1 that is able to enhance reliability against an external force and is able to easily decrease a size in the width direction (right-left direction).

According to this embodiment, since the acted portion 512 of the base 51 comes in contact with the end portion 41 of the bracket 4 in a state where the external force F acts on the upper rail 2, the external force F acting on the upper rail 2 is transmitted to not only the lower rail 3 also the base 51. The external force F1 transmitted to the base 51 is transmitted to the hook 52 via the fixing member 10 and then is transmitted to the striker 54 coming in contact with the inner wall surface of the insertion portion 522 of the hook 52. In this way, since the external force F acting on the upper rail 2 is distributed and transmitted to the lower rail 3 and the striker 54, it is possible to enhance reliability of the sliding device 1 against an external force.

The acted portion 512 of the base 51 is disposed between the end portion 41 of the bracket 4 and the bottom 33 of the lower rail 3 (more specifically, between the end portion 41 and the upper end 61) in the up-down direction. Accordingly, even when the end portion 41 comes in contact with the acted portion 512 and a part of the external force F is transmitted to the acted portion 512, a part of the external force F transmitted to the acted portion 512 is transmitted to the bottom 33 of the lower rail 3 via the upper end 61 and it is thus possible to prevent deformation of the acted portion 512.

According to this embodiment, in a state where the external force F acts on the upper rail 2, a part (external force F1) of the external force F is transmitted to the hook 52 via the bracket 4 and the base 51, and the remaining force (external force F2) of the external force F is transmitted to the hook 52 via the lower rail 3 and the riser 6. Therefore, the external force F1 and the external force F2 are substantially equal to each other, and the sum of the external force F1 and the external force F2 becomes the external force F. The hook 52 is disposed between the base 51 and the riser 6 in the right-left direction (width direction).

In this way, since the external force is transmitted to the hook 52 via two paths of Path 1 passing through the base 51 disposed on the left side of the hook 52 and Path 2 passing through the riser 6 disposed on the right side of the hook 52, the hook 52 comes in line contact with the striker 54 in a state where the external force F acts on the upper rail 2. Accordingly, a large stress locally applied to the striker 54 as a result of a state where the hook 52 is inclined in the right-left direction and comes in point contact with the striker 54 is suppressed. In detail, if an external force is transmitted to the hook 52 via only any one of Paths 1 and 2, the hook 52 comes in contact with the striker 54 in a state of being inclined in the right-left direction and thus the hook 52 and the striker 54 come in point contact with each other. On the other hand, when an external force is transmitted to the hook 52 via both of Paths 1 and 2, the external force F1 acting on the left side of the hook 52 and the external force F2 acting on the right side of the hook 52 are substantially equal to each other, and thus the hook 52 comes in line contact with the striker 54 in a state of being substantially parallel in the right-left direction. As a result, the contact between the hook 52 and the striker 54 becomes line contact. A large stress is also suppressed from being locally applied to the fixing member 10 fixing each of the base 51, the hook 52, and the riser 6. By this configuration, it is possible to enhance reliability of the sliding device 1 against an external force.

While the embodiment of this disclosure has been described above, the technical scope of this disclosure should not be interpreted definitely by the description of the embodiment. It is understood by those skilled in the art that the embodiment is only an example and can be modified in various forms within the scope of the invention described in the appended claims. In this way, the technical scope of this disclosure should be determined based on the scope of the invention described in the claims and a scope equivalent thereto.

In this embodiment, the end portion 41 of the bracket 4 serves as the acting portion that transmits the external force acting on the upper rail 2 to the lower rail 3, but the embodiment of this disclosure is not limited to this configuration. For example, a predetermined portion (other than the end portion 41) of the bracket 4 coming in contact with the acted portion 512 of the base 51 may serve as an acting portion of the bracket 4.

The riser 6 is fixed to the hook 52 and the base 51 by the fixing member 10, but the embodiment of this disclosure is not limited to this configuration. For example, the riser 6 may be fixed to the base 51 by another fixing member and may not be fixed to the hook 52. In this case, the base 51 is fixed to the hook 52 by a fixing member.

The striker 54 is fixed to the floor of the vehicle body, but the embodiment of this disclosure is not limited to this configuration. For example, the striker 54 may be fixed to the riser 6 without being fixed to the floor of the vehicle body.

The acted portion 512 of the base 51 is disposed between the end portion 41 of the bracket 4 and the upper end 61 of the riser 6 in the up-down direction, but the embodiment of this disclosure is not limited to this configuration. For example, the upper end 61 may not extend to the acted portion 512 in the right-left direction, and the acted portion 512 may be disposed between the end portion 41 and the bottom 33 of the lower rail 3 in the up-down direction.

What is claimed is:

1. A seat sliding device for a vehicle, comprising:
a lower rail;
an upper rail, which is supported to be able to slide relative to the lower rail and is fixed to a seat; and
a bracket, which includes an acting portion to transmit a predetermined external force acting on the upper rail to the lower rail and is fixed to the upper rail,
wherein the acting portion is disposed to overlap with a bottom portion of the lower rail in an up-down direction which is perpendicular to a longitudinal direction of the seat sliding device,
the seat sliding device further comprising:
a lock device, which is disposed to overlap with the lower rail in the up-down direction, wherein the lock device includes:
a base;
a hook, which is rotatably fixed to the base and includes an insertion portion;
a pawl, which is rotatably fixed to the base and engages with the hook; and
a striker, which is configured to be inserted into the insertion portion,
wherein the striker is suppressed from being detached from the insertion portion by the hook and the base in a state where the hook and the pawl are engaged with each other,
wherein the base comes in contact with the acting portion hi a state where the predetermined external force is acted on the upper rail, wherein the base is attached to the lower rail,
the seat sliding device further comprising a riser, which is fixed to the base and the lower rail, wherein the hook is disposed between the base and the riser in a width direction, which is perpendicular to both the longitudinal direction and the up-down direction of the sliding device, wherein the base is attached to the lower rail with the riser interposed between the base and the lower rail, wherein the bottom portion of the lower rail is a lowermost face of the lower rail, wherein the acting portion is a free end portion of the bracket, and wherein the acting portion is disposed to overlap with the bottom portion of the lower rail, the base and the riser in an up-down direction.

2. The seat sliding device according to claim 1, wherein the bracket is statically fixed to the upper rail.

3. The seat sliding device of claim 1, wherein the acting portion transmits a part of the external force acting on the upper rail to the bottom portion of the lower rail.

4. The seat sliding device of claim 1, wherein the external force is shared between a top of the upper rail and the bottom portion of the lower rail via the acting portion.

5. The seat sliding device according to claim 1, wherein, in a state where the external force does not act on the upper rail, a clearance is formed between the acting portion and the base of the lock device.

6. The seat sliding device according to claim 1, wherein, in a state where the external force does not act on the upper rail, a clearance is formed between the acting portion of the bracket and an acted portion of the base in the up-down direction, and a clearance is formed between the acted portion of the base and an upper end of the riser in the up-down direction.

7. The seat sliding device according to claim 1, wherein an acted portion of the base contacts the acting portion of the bracket in a state where the external force acts on the upper rail.

8. The seat sliding device according to claim 1, wherein the riser includes an acted portion disposed between the acting portion of the bracket and the bottom portion of the lower rail.

9. The seat sliding device of claim 1, wherein the base and the lower rail comprise separate components.

* * * * *